US011245262B2

(12) United States Patent
Ren et al.

(10) Patent No.: US 11,245,262 B2
(45) Date of Patent: Feb. 8, 2022

(54) ADAPTIVE VOLTAGE BANDWIDTH FOR A VOLTAGE REGULATION DEVICE

(71) Applicant: Eaton Intelligent Power Limited, Dublin (IE)

(72) Inventors: Wei Ren, Plymouth, MN (US); Jalpa Shah, Woodbury, MN (US); Hossein Ghassempour Aghamolki, Edina, MN (US)

(73) Assignee: Eaton Intelligent Power Limited, Dublin (IE)

( * ) Notice: Subject to any disclaimer, the term of this patent is extended or adjusted under 35 U.S.C. 154(b) by 68 days.

(21) Appl. No.: 16/457,085

(22) Filed: Jun. 28, 2019

(65) Prior Publication Data

US 2020/0036188 A1 Jan. 30, 2020

Related U.S. Application Data

(60) Provisional application No. 62/711,931, filed on Jul. 30, 2018.

(51) Int. Cl.
*H02J 3/38* (2006.01)
(52) U.S. Cl.
CPC .................. *H02J 3/381* (2013.01)
(58) Field of Classification Search
CPC .................. H02J 3/381; H02J 3/12
USPC ......................................................... 307/43
See application file for complete search history.

(56) References Cited

U.S. PATENT DOCUMENTS

| 5,596,263 A * | 1/1997 | Zavis | G05F 1/14 |
| | | | 323/255 |
| 2016/0156226 A1* | 6/2016 | Itaya | H02J 3/14 |
| | | | 323/234 |
| 2016/0231756 A1* | 8/2016 | Baerthlein | G05F 1/16 |
| 2018/0081380 A1 | 3/2018 | Baerthlein et al. | |

OTHER PUBLICATIONS

John Mead et al., "Advanced Control Technologies for Distribution Grid Voltage and Stability with Electric Vehicles and Distributed Generation," Energy Research and Development Division, Final Project Report, Mar. 2015, CEC-500-2015-046, 79 total pages.

(Continued)

*Primary Examiner* — Toan T Vu
(74) *Attorney, Agent, or Firm* — DiBerardino McGovern IP Group LLC

(57) ABSTRACT

A voltage regulation system for an electrical power distribution network that receives electricity from one or more distributed energy resources includes: a voltage regulation device configured to maintain a voltage in the electrical power distribution network to within a voltage bandwidth, the voltage bandwidth including a range of voltages; and a control system coupled to the voltage regulation device, the control system configured to: analyze voltage data, the voltage data including a plurality of voltage samples, each of the voltage samples representing the voltage in the electrical power distribution network at a time within a period of time; determine an adjusted voltage bandwidth for the voltage regulation device based on the analysis; and change the voltage bandwidth of the voltage regulation device to the adjusted voltage bandwidth.

23 Claims, 6 Drawing Sheets

(56) References Cited

OTHER PUBLICATIONS

"Voltage Regulators," Cooper Power System's VR-32 Regulator and CL-2A Control Installation, Operation and Maintenance Instructions Parts Replacement Information, S225-10-5, Oct. 1992, 4 total pages.

Ties Ramcke, European International Searching Authority, International Search Report and Written Opinion, counterpart PCT Application No. PCT/EP2019/025248 dated Nov. 13, 2019, 9 pages total.

* cited by examiner

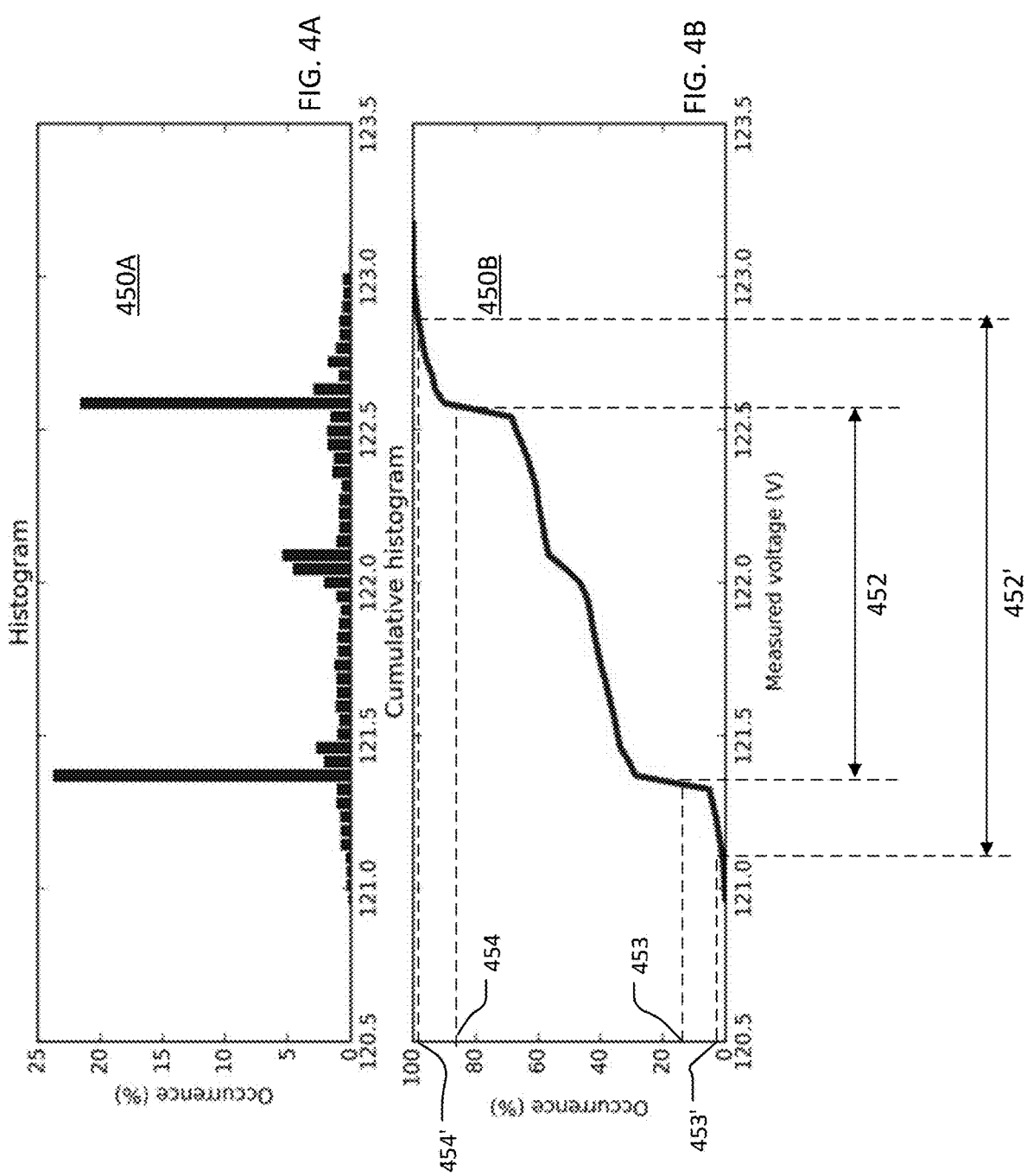

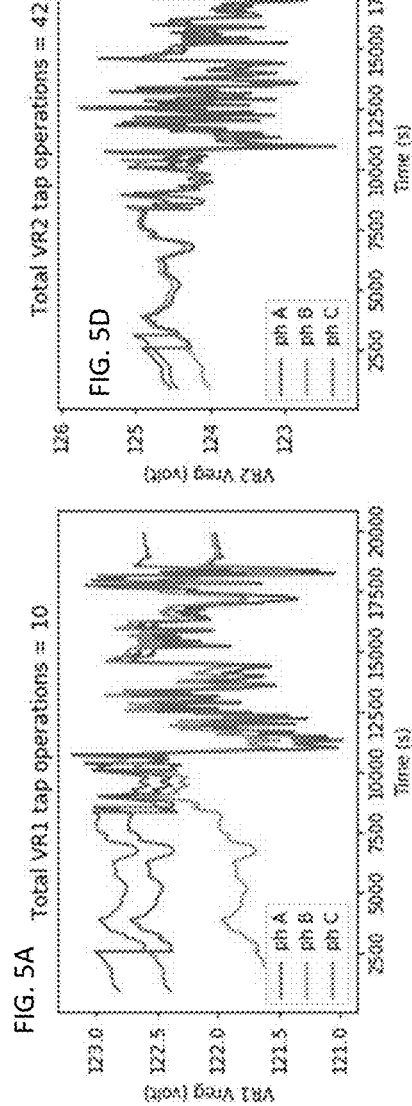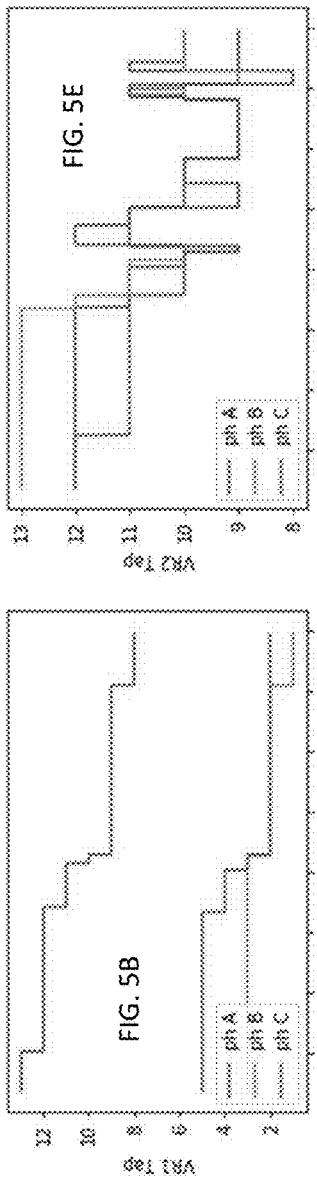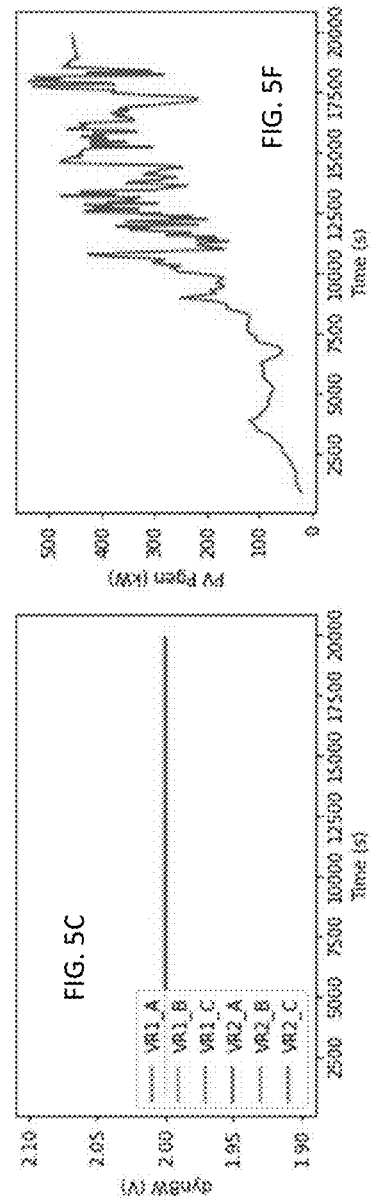

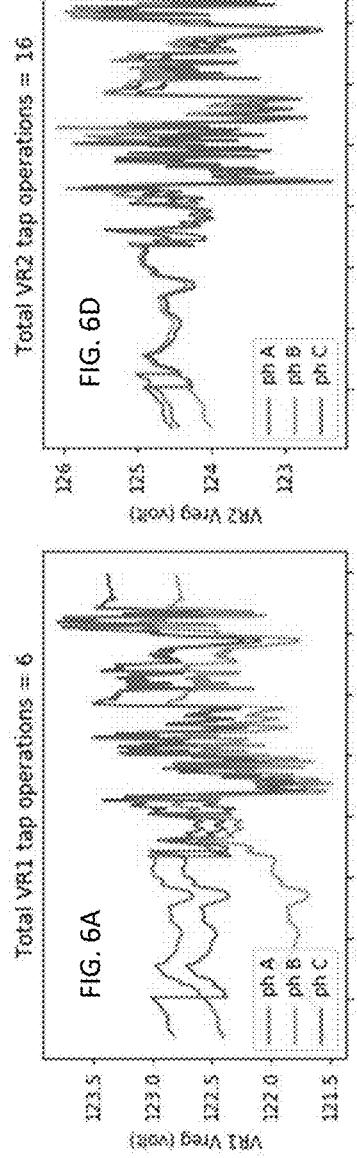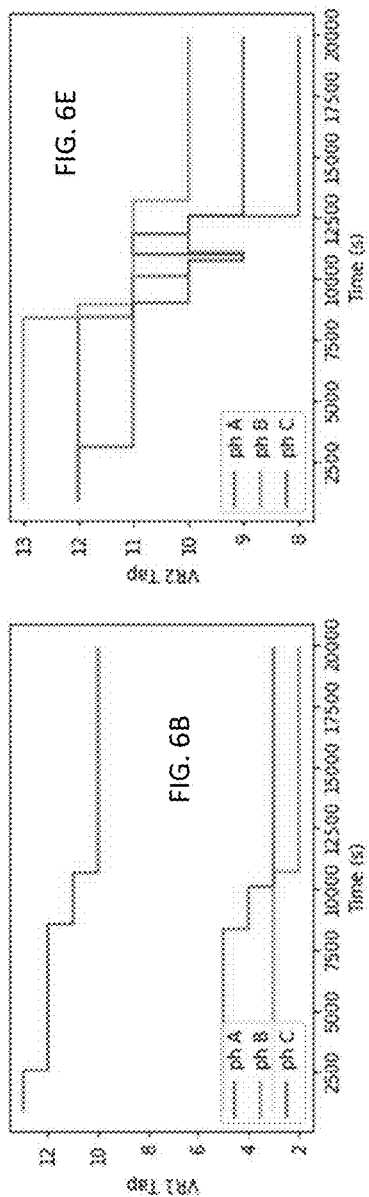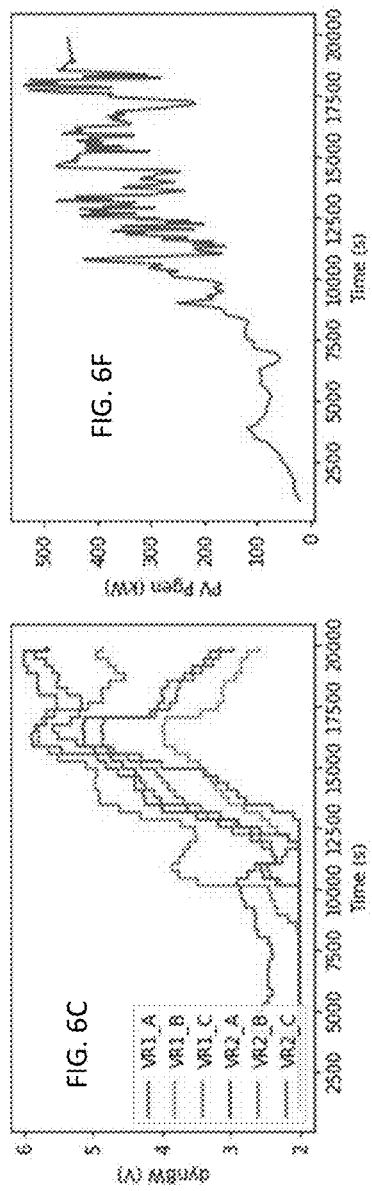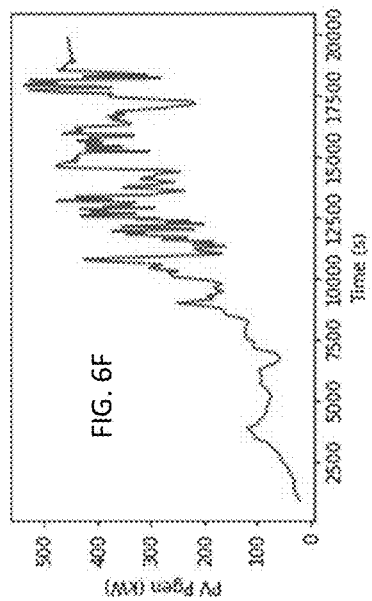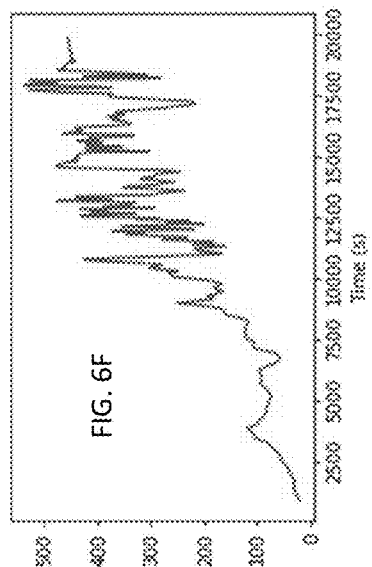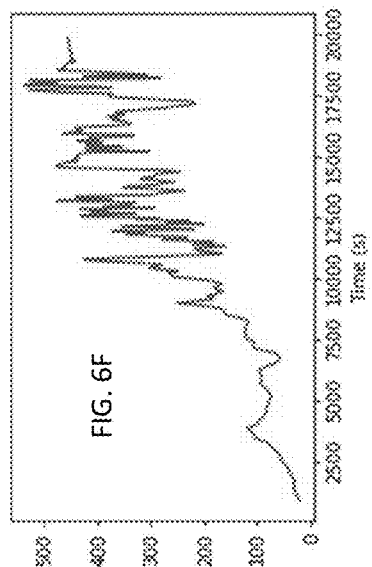

ADAPTIVE VOLTAGE BANDWIDTH FOR A VOLTAGE REGULATION DEVICE

CROSS-REFERENCE TO RELATED APPLICATION

This application claims the benefit of U.S. Provisional Application No. 62/711,931, filed on Jul. 30, 2018 and titled ADAPTIVE VOLTAGE BANDWIDTH FOR A VOLTAGE REGULATION DEVICE, which is incorporated herein by reference in its entirety.

TECHNICAL FIELD

This disclosure relates to an adaptive voltage bandwidth for a voltage regulation device, and a control system for controlling a voltage regulation device to have an adaptive voltage bandwidth.

BACKGROUND

Voltage regulation systems are used to monitor and control a voltage level in an electrical power distribution network. The voltage regulation system performs a voltage regulation operation to change the voltage level in the electrical power distribution network when the voltage level in the network is outside of a range of voltages that correspond to a voltage bandwidth. The voltage regulation operation brings the voltage in the electrical power distribution network closer to a set voltage, which is within the voltage bandwidth. In a traditional voltage regulation system, the voltage bandwidth is fixed and does not change during operation of the voltage regulator.

SUMMARY

In one general aspect, a voltage regulation system for an electrical power distribution network that receives electricity from one or more distributed energy resources includes: a voltage regulation device configured to maintain a voltage in the electrical power distribution network to within a voltage bandwidth, the voltage bandwidth including a range of voltages; and a control system coupled to the voltage regulation device, the control system configured to: analyze voltage data, the voltage data including a plurality of voltage samples, each of the voltage samples representing the voltage in the electrical power distribution network at a time within a period of time; determine an adjusted voltage bandwidth for the voltage regulation device based on the analysis; and change the voltage bandwidth of the voltage regulation device to the adjusted voltage bandwidth.

Implementations may include one or more of the following features. The control system being configured to analyze voltage data may include the control system being configured to determine a distribution of occurrences of each of a plurality of voltage levels in the electrical power distribution network over the time period from the voltage data, the control system being configured to determine an adjusted voltage bandwidth may include the control system being configured to determine a minimum voltage and a maximum voltage from the distribution of occurrences, and the control system being configured to change the voltage bandwidth of the voltage regulation device may include the control system being configured to set the range of voltages to be between the determined minimum voltage and the determined maximum voltage. The distribution of occurrences may be a cumulative distribution. The control system being configured to determine a minimum voltage may include the control system being configured to determine a voltage exceeded by a first percentage of voltage samples, and the control system being configured to determine a maximum voltage may include the control system being configured to determine a voltage exceeded by a second percentage of voltage samples.

In some implementations, the control system is configured to analyze voltage by estimating the standard deviation of the voltage in the electrical power distribution over the period of time, the control system is configured to determine an adjusted voltage bandwidth by determining a minimum voltage and a maximum voltage based on the estimated standard deviation, and the control system is configured to change the voltage bandwidth of the voltage regulation device by setting the range of voltages to be between the determined minimum voltage and the determined maximum voltage.

The voltage regulation system also may include a voltage sampling module configured to measure the voltage in the power distribution network at a particular time to generate one of the plurality of voltage samples.

The control system may be further configured to store the plurality of voltage samples.

In another general aspect, a method of controlling a voltage regulation device that regulates a voltage in an electrical power distribution network includes: obtaining a plurality of voltage samples, each voltage sample being an indication of a voltage level in the electrical power distribution network at a time within a period of time; determining a count of occurrences of each of a plurality of voltage level ranges during the time period from the plurality of voltage samples; analyzing the determined count of occurrences to determine an adjusted voltage bandwidth for the voltage regulation device; and changing the voltage bandwidth of the voltage regulation device to the determined adjusted voltage bandwidth.

Implementations may include one or more of the following features. Changing the voltage bandwidth of the voltage regulation device may include replacing a previous voltage bandwidth of the voltage regulation device with the determined adjusted voltage bandwidth such that the voltage regulation device performs a voltage regulation operation when the voltage level in the electrical power distribution network is outside of the determined adjusted voltage bandwidth.

The period of time may be a first period of time, and the determined adjusted voltage bandwidth may be a first determined adjusted bandwidth, and, in these implementations, the method also includes obtaining a second plurality of voltage samples, at least one of the voltage samples in the second plurality of voltage samples being an indication of a voltage level in the electrical power distribution network at a time during a second time period, the second time period including at least one time that is not within the first period of time; analyzing the second plurality of voltage samples to determine a second adjusted voltage bandwidth for the voltage regulation device; and changing the voltage bandwidth of the voltage regulation device from the first determined adjusted voltage bandwidth to the second adjusted voltage bandwidth.

Implementations of any of the techniques described herein may include a voltage regulation device, a system that includes a voltage regulation device and a control system configured to control the voltage regulation device, software stored on a non-transitory computer readable medium that, when executed, controls a voltage regulation device, a kit for retrofitting a voltage regulation device, and/or a method. The details of one or more implementations are set forth in the accompanying drawings and the description below. Other features will be apparent from the description and drawings, and from the claims.

DRAWING DESCRIPTION

FIGS. 4A, 4B, 5A-5F, and 6A-6F are examples of simulated results.

DETAILED DESCRIPTION

Techniques for controlling a voltage regulation device in an electrical power distribution network that receives electricity from at least one distributed energy resource (DER) are disclosed. As discussed below, the technique includes analyzing the voltage in the electrical power distribution network over a period of time and adapting a bandwidth of the voltage regulation device based on the analysis. The bandwidth is adapted while the voltage regulation device is in use, thus, the techniques discussed herein allow the voltage regulation device to adapt to changing conditions in the electrical power distribution network. For example, the power produced by a DER may vary rapidly in time, causing a corresponding rapid variation of the voltage in the power in the power distribution network. The voltage regulation device responds by operating more frequently than is typical, leading to excessive wear on the voltage regulation device. Additionally, because the power output of the DER may vary more rapidly than the response time of the voltage regulation device, additional operations performed by the voltage regulation device may not improve the regulation of the voltage in the power distribution network. As discussed below, dynamically adjusting the bandwidth of the voltage regulation device based on measured voltage levels reduces unnecessary operation of the voltage regulation device while still allowing the voltage regulation device to maintain the voltage on the power distribution network.

Figure 1:
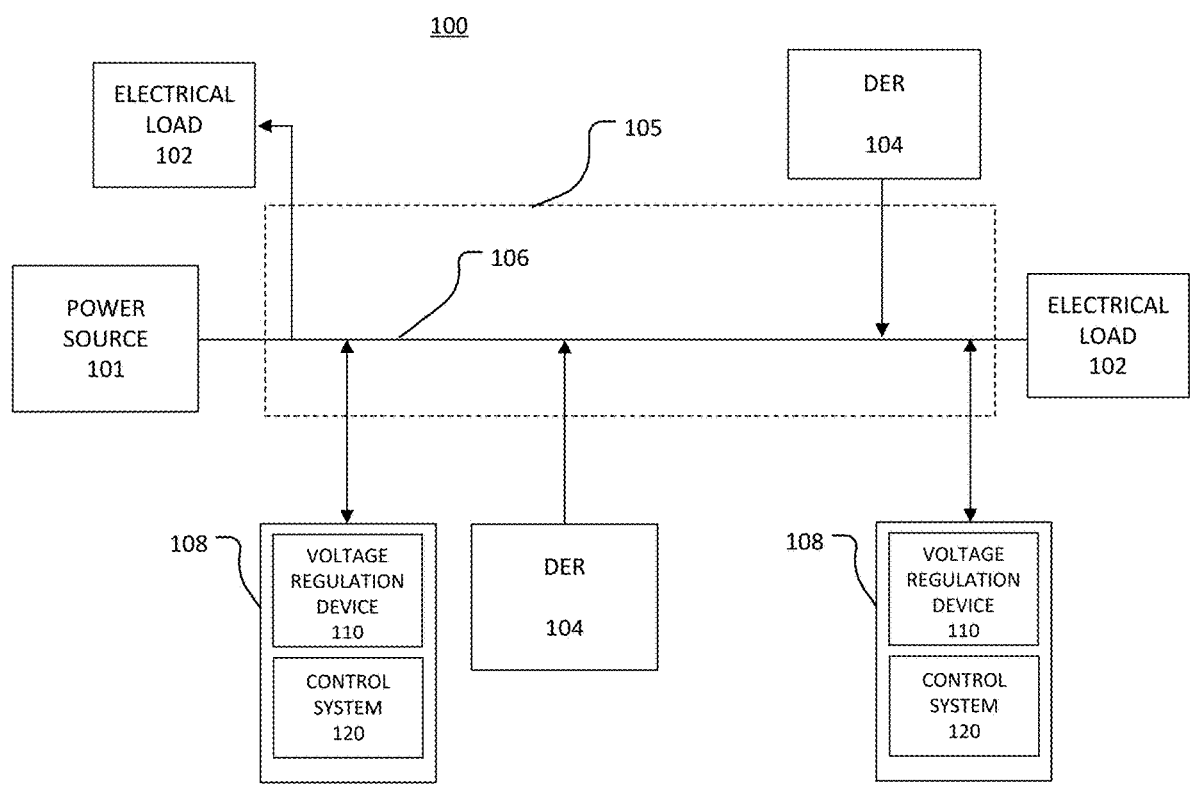
FIG. 1 is a block diagram an example of an electrical power system.

Referring to FIG. 1, a block diagram of an example of an electrical power system 100 is shown. The power system 100 includes an electrical power distribution network 105, which transfers electricity from power sources 101 (including distributed energy resources 104) to electrical loads 102 via a distribution path 106. The electrical loads 102 may be any device that utilizes electricity and may include electrical equipment that receives and transfers or distributes electricity to other equipment in the electrical power distribution network 105. The electrical loads 102 may include, for example, transformers, fuses, rechargeable batteries, electrical machinery in a manufacturing facility, and/or electrical appliances and systems in a residential building. The electrical power distribution network 105 may be, for example, an electrical grid, an electrical system, or a multi-phase electrical network that provides electricity to commercial and/or residential customers. The power distribution network 105 may have an operating voltage of, for example, at least 1 kilovolt (kV), up to 34.5 kV, up to 38 kV, up to 69 kV, or 69 kV or higher. The power distribution network 105 may operate at a fundamental frequency of, for example, 50-60 Hertz (Hz). The distribution path 106 may include, for example, one or more distribution lines, electrical cables, wireless distribution paths, and/or any other mechanism for transmitting electricity.

The power sources 101 may include any source of electricity such as, for example, a power plant or an electrical substation, and the power sources 101 include at least one distributed energy resource (DER) 104. A distributed energy resource (DER) is any type of source of electricity that is capable of providing localized power the power distribution network 105. DERs may be distributed throughout the network 105 and thus may be located relatively close to a particular load. The amount of energy generated by a DER is generally less than a traditional, centralized power source. For example a DER may generate 1 kiloWatt (kW) to 10,000 kW of electricity. DERs may be used with traditional, centralized power sources (for example, coal-fired plants, large-scale power stations, and hydroelectric dams) to enhance and improve the performance of the power distribution network 105. Examples of DERs include solar energy systems, wind energy systems, micro-turbines, batteries and other energy storage devices, modular kinetic energy turbines, waste-to-energy turbines, diesel generators, and fuel cells. Thus, a DER may be a renewable or traditional source of energy. Some DERs, such as fuel cells, are "fully dispatchable." A fully dispatchable DER is capable of producing a commanded amount of electrical power so long as the DER has access to sufficient fuel to generate the requested power. Other DERs, such as solar systems and wind systems, are not fully dispatchable. The amount of electricity generated by a DER that is not fully dispatchable may vary dramatically over a period of time during which the DER would nominally be expected to produce a relatively constant amount of electricity. For example, the DER may be a solar energy system that includes an array of photovoltaic (PV) devices that convert sunlight into electricity. The amount of electricity generated by the solar energy system is expected to be fairly constant during a sunny day. However, the amount of generated electricity may drop quickly when a cloud comes between the PV device and the sun, and the amount of generated electricity may rise quickly a short time later when the cloud moves away and is no longer between the PV device and the sun. Similarly, a DER source that includes a wind-based energy system (such as a wind turbine) generally cannot be commanded to produce a particular amount of electric power and is not fully dispatchable.

The power system 100 also includes one or more voltage regulation systems 108, each of which monitors and controls the amount of voltage in the power distribution network 105. For example, the voltage regulation systems 108 may be used to keep a steady-state voltage of the electrical power distribution network 105, or of a portion of the network 105, within a voltage range such that the voltage level at the electrical equipment 102 also stays within an acceptable range.

Each voltage regulation system 108 may be any type of electrical, mechanical, or electro-mechanical device that is capable of performing a voltage regulation operation that changes the voltage on the distribution path 106 without interrupting electrical service to the connected electrical loads 102. The voltage regulation system 108 may be, for example, a load-tap changer, a line voltage regulator, or a switched capacitor. The voltage regulation operation may be any action that the voltage regulation system 108 is capable of performing to change the voltage on the distribution path

106. The lifetime of the voltage regulation system 108 may be measured by the number of voltage regulation operations that the system 108 is expected to be able to perform without needed to be replaced and/or repaired.

Because the electrical power produced by a DER 104 that is not fully dispatchable may vary greatly over a relatively short amount of time and may vary in ways that are unpredictable, using electricity generated by a DER that is not fully dispatchable causes a typical voltage regulation system to perform voltage regulation operations more frequently as compared to a configuration in which DERs are not used as sources of electricity or only fully dispatchable DERs are used. The typical voltage regulation system may be capable of performing the voltage regulation operations with sufficient frequency and accuracy to maintain the voltage level of the distribution path 106 within the fixed and unchanging voltage range associated with the voltage regulation device despite variations in the amount of supplied electricity caused by the DER 104. However, using the typical voltage regulation system in this manner may result in having to replace or repair the typical voltage regulation system more quickly than expected.

On the other hand, the voltage bandwidth of the voltage regulation device 110 is adaptable. By adapting the bandwidth of the voltage regulation device 110 dynamically or while voltage regulation system 108 is in operation, the voltage on the distribution path 106 is maintained within an acceptable range of voltages while also reducing or minimizing the number of voltage regulation operations performed by the voltage regulation system 108. Reducing the number of voltage regulation operations extends the lifetime of the voltage regulation system 108. Thus, the voltage regulation device 110 is able to provide more robust voltage regulation even when the DER 104 is not fully dispatchable.

Furthermore, the voltage regulation device 110 also improves performance in configurations in which the DER 104 is a fully dispatchable DER. In these configurations, the DER 104 is able to provide some voltage regulation, and the voltage regulation is shared by the DER 104 and the voltage regulation system 108. In this scenario, the bandwidth of the voltage regulation device 110 is adapted to be more narrow. Thus, the voltage regulation device 110 performs fewer voltage regulation operations (due to the DER 104 performing some of the voltage regulation operations), but the voltage regulation device 110 still maintains the voltage in the distribution path 106 to within an acceptable range using the adapted narrow voltage bandwidth.

Figure 3:
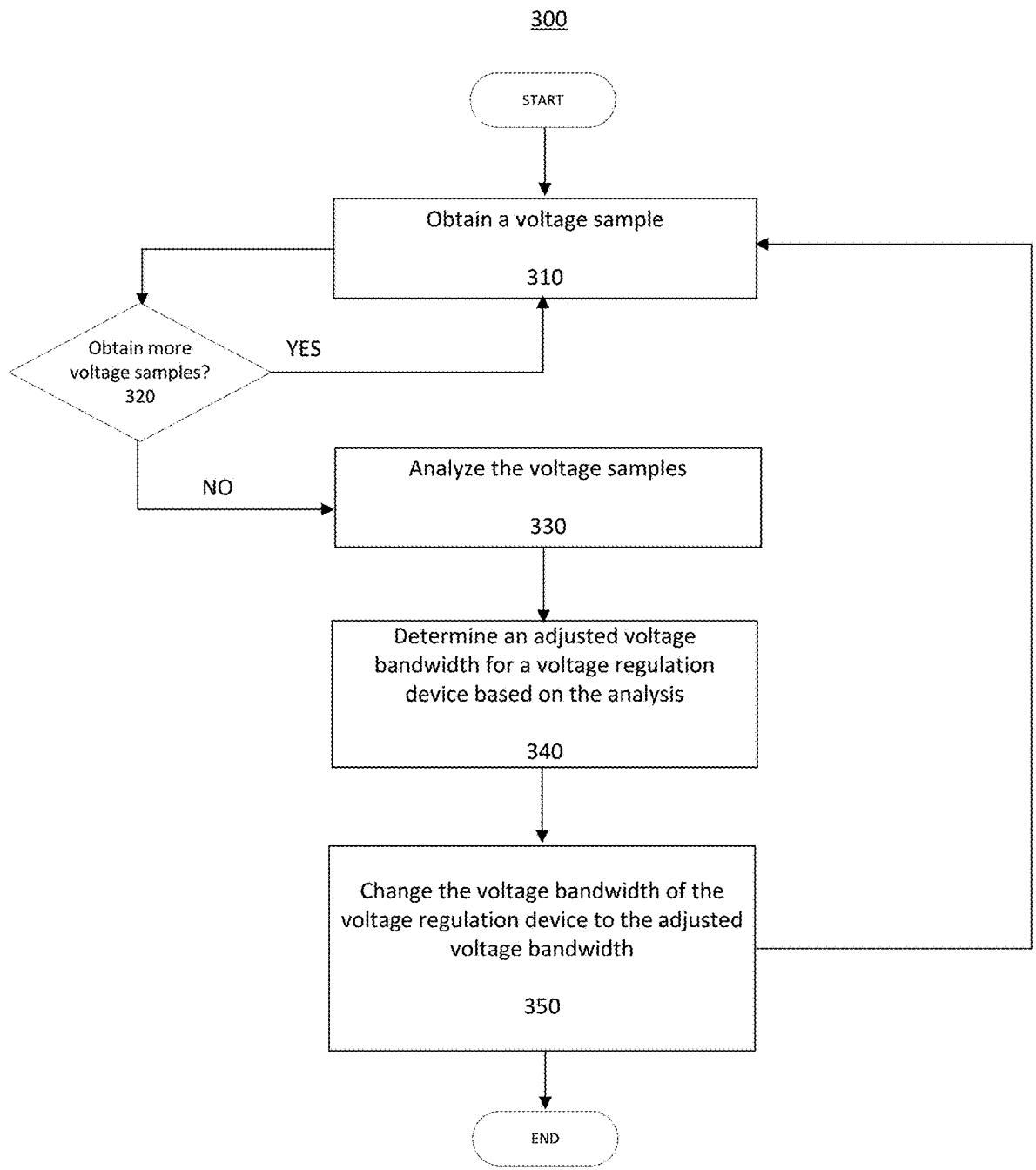
FIG. 3 is a flow chart of an example of a process for controlling a voltage regulation device.

FIG. 3 provides an example of a process that may be used to adapt the bandwidth of a voltage regulation device in an electrical power distribution network that uses electricity from one or more DERs. The voltage regulation system 108 is discussed in greater detail before discussing the example of a process to control the voltage regulation device 110.

Figure 2A:
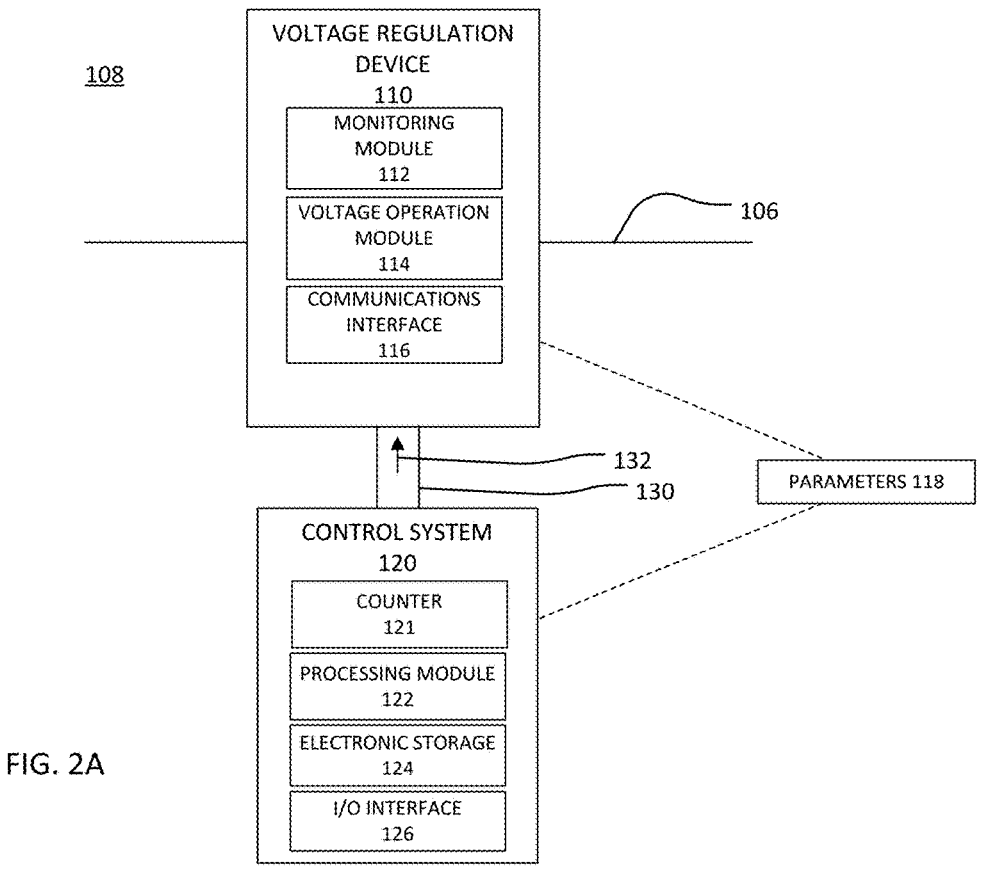
FIG. 2A is a block diagram of an example of a voltage regulation system.

FIG. 2A is a block diagram of the voltage regulation system 108. The voltage regulation device 110 includes a monitoring module 112, a voltage operation module 114, and a communications interface 116. The voltage regulation device 110 is also associated with operating parameters 118. The operating parameters 118 are settings, values, or metrics that define the conditions of operation of the voltage regulation device 110.

The monitoring module 112 monitors the voltage on the distribution path 106. For example, the monitoring module 112 may include a voltage meter, voltage transformer, current meter, or other device that is capable of measuring the voltage on the distribution path 106 or providing data from which the voltage on the distribution path 106 may be derived. The monitoring module 112 may be associated with a sampling rate that indicates how often the monitoring module 112 obtains or receives an indication of the voltage on the distribution path 106.

The voltage operation module 114 acts to change the output voltage of the voltage regulation device 110 to thereby change voltage on the distribution path 106. The communications interface 116 connects to a control cable 130 and enables data to be sent from the voltage regulation device 110 to the control system 120 and vice versa. For example, the communications interface 116 may send voltage measurements collected or received by the monitoring module 112 to the control system 120.

Figure 2B:
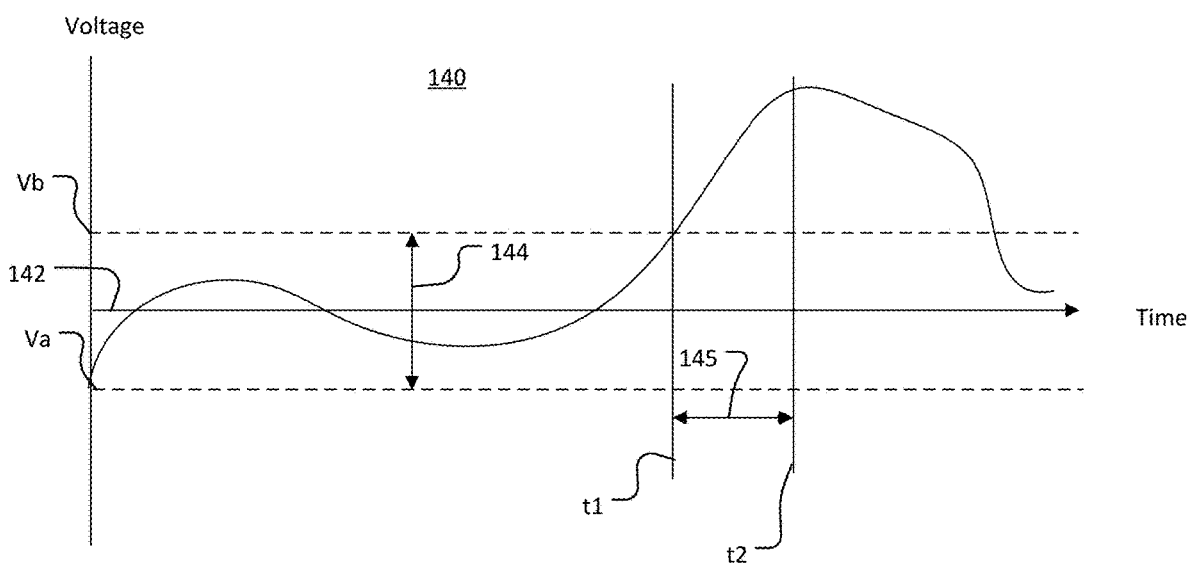
FIG. 2B shows an example of voltage on a distribution path over time.

FIG. 2B is a plot 140 that shows an example of voltage on the distribution path 106 as a function of time. The plot 140 also provides an example of three of the operating parameters 118 of the voltage regulation device 110: a set voltage 142, a voltage bandwidth 144, and a time delay 145. As discussed with respect to FIG. 3, the control system 120 analyzes the voltage level of the distribution path 106 over a period of time and adjusts the voltage bandwidth 144 based on the analysis the performance of the voltage regulation system 108. Thus, the voltage regulation device 110 has a dynamic or adaptive voltage bandwidth 144.

The set voltage 142 is the voltage that the voltage regulation system 108 seeks to maintain on the path 106. The set voltage 142 may be, for example, 120V or 240V. Although the voltage regulation system 108 seeks to maintain the voltage level on the distribution path 106 at the set voltage 142, a voltage level that is not the set voltage 142 but is within the voltage range 144 is also acceptable. The voltage range 144 is a continuous range of voltages about the set voltage 142 that are acceptable for proper operation of the loads 102. The voltage range 144 has a maximum voltage of Vb and a minimum voltage of Va, and the set voltage 142 may be in the center of the voltage range 144. The difference between Vb and Va may be, for example, 1 to 3 V. For an implementation in which the set voltage 142 is 120 V and the voltage range 144 spans 2 V, Vb is 121 V and Va is 119 V. Va and Vb are part of the parameters 118 and may be changed during operational use of the voltage regulation system 108 to adapt the voltage bandwidth 144.

The voltage on the distribution path 106 is outside of the voltage range 144 when the voltage on the distribution path 106 is greater than Vb or less than Va. When the voltage on the distribution path 106 is outside of the voltage range 144, the voltage regulation device 110 performs a voltage regulation operation after the expiration of a time delay 145. The time delay 145 may be, for example, between 30 and 60 seconds. The time delay 145 is a period of time that the control system 120 waits before issuing a command signal 132 that causes the voltage regulation device 110 to perform a voltage regulation operation. During the delay time 145, the voltage regulation device 110 is in a "time delay state" and does not perform a voltage regulation operation. The time delay 145 is associated with a counter 121 that is incremented and/or decremented by an increment amount (Tcnt) until the counter 121 expires or reaches the end of the time delay 145. The increment amount (Tcnt) also may be a parameter 118 of the voltage regulation device 110. When the counter 121 expires, the control system 120 issues a command signal 132 to the voltage regulation device 110, and the voltage regulation device 110 performs a voltage regulation operation based on the command signal 132. In the example of FIG. 2B, the voltage on the distribution path 106 moves out of the voltage range 144 at a time t1, and the time delay 145 begins at the time t1. The counter 121 expires at the time t2. At the time t2, the control system 120 issues the command signal 132 such that the voltage regulation device 110 performs the voltage regulation operation.

Referring again to FIG. 2A, the control cable 130 couples the control system 120 to the voltage regulation device 110. To cause the voltage regulation device 110 to perform a voltage regulation operation, the control system 120 generates a command signal 132 and provides the command signal 132 to the communications interface 116 via the control cable 130.

The control cable 130 may be any type of cable capable of transferring data between the voltage regulation device 110 and the control system 120. The control cable 130 may be a wired (physical) cable, a wireless connection, or a combination of wired and wireless connections. Moreover, although the voltage regulation device 110 and the control system 120 are shown as being separate systems that are connected by the control cable 130, in other implementations, the control system 120 and the voltage regulation device 110 may be housed together in a single housing or unit or otherwise integrated in a single device.

The control system 120 includes the counter 121, an electronic processing module 122, an electronic storage 124, and an input/output (I/O) interface 126. The counter 121 may be implemented as a set of instructions and stored on the electronic storage 124. The electronic processing module 122 includes one or more electronic processors. The electronic processors of the module 122 may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 124 may be any type of electronic memory that is capable of storing data, and the electronic storage 124 may include volatile and/or non-volatile components. The electronic storage 124 and the processing module 122 are coupled such that the processing module 122 may access or read data from the electronic storage 124 and may write data to the electronic storage 124. The electronic storage 124 may store default values for the operating parameters 118 and also may store updated values for the operating parameters 118. Furthermore, the electronic storage 124 may store voltage samples collected during one or more periods of time. Additionally, the electronic storage 124 stores machine-readable instructions, perhaps in the form of a computer program, that, when executed by the processing module 122, control the voltage regulation device 110 through a process such as discussed with respect to FIG. 3.

The I/O interface 126 may be any interface that allows a human operator and/or an autonomous process to interact with the control system 120. The I/O interface 126 may include, for example, a display, a keyboard, audio input and/or output (such as speakers and/or a microphone), a serial or parallel port, a Universal Serial Bus (USB) connection, and/or any type of network interface, such as, for example, Ethernet. The I/O interface 126 also may allow communication without physical contact through, for example, an IEEE 802.11, Bluetooth, or a near-field communication (NFC) connection. The control system 120 may be, for example, operated, configured, modified, or updated through the I/O interface 126.

The I/O interface 126 also may allow the control system 120 to communicate with systems external to and remote from the system 108. For example, the I/O interface 126 may include a communications interface that allows communication between the control system 120 and a remote station (not shown), or between the control system 120 and an electrical apparatus other than the voltage regulation device 110, through the I/O interface 126 using, for example, the Supervisory Control and Data Acquisition (SCADA) protocol or another services protocol. The remote station may be any type of station through which an operator is able to communicate with the control system 120 without making physical contact with the control system 120. For example, the remote station may be a computer-based work station, a smart phone, tablet, or a laptop computer that connects to the control system 120 via a services protocol, or a remote control that connects to the control system 120 via a radio-frequency signal.

Referring to FIG. 3, a flow chart of a process 300 is shown. The process 300 is an example of a process for controlling a voltage regulation device. The process 300 is discussed with respect to the voltage regulation system 108, the control system 120, and the voltage regulation device 110. In the example discussed below, the process 300 is performed by one or more electronic processors in the processing module 122.

A voltage sample is obtained (310). The voltage sample is an indication of the voltage level in the electrical power distribution network 105 at a particular instance in time. For example, the voltage sample may include a numerical value that represents a measured voltage value of the voltage level in the electrical power distribution network 105 at the particular instance in time. The voltage measurement included in the voltage sample may be a measurement obtained by a voltage sensor in the monitoring module 112. In some implementations, the voltage measurement is a measurement obtained by another voltage sensor that is separate from the voltage regulation device 110 but sees the same voltage as the voltage regulation device 110. The voltage sample is provided to the control system 120. For example, in implementations in which the voltage measurement is made by the monitoring module 112, the voltage sample is provided to the control system 120 via the control cable 130. The voltage sample may be stored in the in the electronic storage 124 of the control system 120.

More than one voltage sample is obtained to form voltage data. Voltage data is a collection of voltage samples, each of which indicates the voltage level of the electrical power distribution network 105 at a different time within a time period. In other words, the voltage data is data that represents the voltage level in the electrical power distribution network 105 over the time period. The voltage samples are collected at a sample rate that is constant over the time period. The time period is sufficiently long to collect enough voltage samples to be able to determine an adjustment to the voltage bandwidth 144. For example, the time period may be an hour or greater, and the sample rate may be one sample per second.

The obtained voltage samples accumulate in the electronic storage 124 until a threshold number of voltage samples is obtained. The threshold number of voltage samples may be a pre-set number of voltage samples or voltage samples that are obtained over a pre-set amount of time. The number of obtained voltage samples is compared to the threshold number of voltage samples (320). If at least the threshold number of voltage samples have accumulated in the electronic storage 124, then the voltage data is considered complete and the voltage data is analyzed (330). If the threshold number of voltage samples have not been obtained, then the process 300 continues to obtain voltage samples (310) until the number of obtained voltage samples meets the threshold.

When a threshold number of new voltage samples have been obtained, the voltage data is analyzed to determine how to adjust the voltage bandwidth 144 of the voltage regulation device 110. A new voltage sample is a voltage sample that has not been previously analyzed. The process 300 is an on-going process that is used to adapt the voltage bandwidth of the voltage regulation device 110 while the voltage regulation device 110 is in use. Thus, although one instance of voltage data is discussed in this example, it is understood that the process 300 may be used to generate and analyze many instances of voltage data, each instance being for a different period of time, such that the voltage bandwidth of the voltage regulation device 110 may be updated every time the threshold number of voltage samples is obtained. The periods of time are different because each of the various instances of voltage data include at least one voltage sample at an instance in time that is not part of any other previously analyzed instance of voltage data. In some implementations, each instance of voltage data includes a unique time period such that no voltage sample is present in more than one instance of voltage data.

The voltage bandwidth 144 of the voltage regulation device 110 may be updated once every several minutes, once an hour, or once a day depending on the application. Additionally, frequency of updating, adapting, or changing of the voltage bandwidth 144 may be set by an operator of the voltage regulation device 110. For example, the number of voltage samples that are to be obtained prior to analyzing the voltage date and/or the time period over which voltage samples are obtained may part of the parameters 118, and, in some implementations, the operator is able to set these parameters through the I/O interface 126.

In some implementations, the voltage data is analyzed by determining a distribution based on the voltage data, and the distribution is used to determine a minimum voltage and a maximum voltage that forms an adjusted voltage bandwidth. The distribution may be, for example, a histogram that represents a number of occurrences of voltages within each of a plurality of voltage ranges or voltage bin. The distribution may have other forms. For example, the distribution may be a histogram that represents a portion or percentage of voltage samples in the voltage data that have a particular voltage value. In another example, the distribution may be a cumulative histogram. Moreover, the distribution may be an estimated distribution or a distribution may be based on assumptions. For example, the voltage data may be assumed to have a normal distribution (that is, a Gaussian distribution). Furthermore, analyzing the voltage data may include calculating additional values from the distribution and/or from the voltage data. For example, a standard deviation, mean, maximum, and/or minimum of the voltage values may be determined.

An adjusted voltage bandwidth for the voltage regulation device 110 is determined (340). As discussed above, the voltage regulation device 110 is associated with the voltage bandwidth 144, which is a range of voltages between the maximum voltage of Vb and the minimum voltage of Va. The adjusted voltage bandwidth is a range of voltages that is different from the voltage bandwidth 144. For example, the adjusted voltage bandwidth may have a minimum voltage that is different from the minimum voltage Va and/or a maximum voltage that is different from the maximum voltage Vb.

The adjusted voltage bandwidth is determined from the voltage data and is thus able to adapt to current conditions in the electrical power distribution network 105. For example, the adjusted voltage bandwidth may be determined from the distribution determined in (330). In some implementations, the minimum voltage for the adjusted voltage bandwidth is set based on a voltage at which a pre-determined percentage or number of voltage samples is below. For example, the minimum voltage for the adjusted voltage bandwidth may be a voltage level that is greater than the lowest 20% of voltage samples (or a voltage level that is exceeded by 80% of the voltage samples). The maximum voltage of the adjusted voltage bandwidth may be set from the distribution. For example, the maximum voltage of the adjusted voltage bandwidth may be a voltage that is exceeded by only the highest 15% of the voltage samples. An adjusted voltage bandwidth may be determined from the minimum and maximum voltages derived from the distributions.

In some implementations, the distribution and/or the voltage data is used to determine a minimum voltage and a maximum voltage that defines an initial adjusted bandwidth, and a scaling factor is then applied to the initial adjusted voltage bandwidth. For example, the scaling factor may be applied to the initial adjusted voltage bandwidth to make an adjusted bandwidth that is wider than the initial adjusted voltage bandwidth. A wider bandwidth includes a greater range of voltages, and the difference between the maximum voltage and the minimum voltage is greater for a wider voltage bandwidth than for a more narrow voltage bandwidth. The scaling factor may be saved in the electronic storage 124 as one of the parameters 118 of the voltage regulation device 110. The scaling factor may be pre-determined or set by an operator of the voltage regulation device 110.

Widening the initial adjusted voltage bandwidth may be beneficial because, with a relatively wide voltage bandwidth, the voltage regulation device 110 is less likely to perform a voltage regulation for intermittent variations caused by a DER. This increases the lifetime of the voltage regulation device 110. However, by basing the adjusted voltage bandwidth on the voltage data and scaled by factor that is either pre-determined or controllable by an operator, the adjusted voltage bandwidth is not so wide that the voltage regulation device 110 fails to perform voltage regulation operations when needed.

In some implementations, the adjusted voltage bandwidth is set to a value that depends on a property of the distribution or the voltage data. For example, in implementations in which the voltage data is assumed to fit a normal distribution, the adjusted voltage bandwidth may be set based on the standard deviation of the voltage data. In these implementations, the adjusted voltage bandwidth may be, for example, the standard deviation multiplied by a pre-determined numerical value. The pre-determined numerical value may be saved in the electronic storage 124 as one of the parameters 118.

The voltage bandwidth 144 of the voltage regulation device 110 is changed to the adjusted voltage bandwidth (350). The voltage bandwidth 144 may be changed by, for example, changing the value for the minimum voltage Va and/or the maximum voltage Vb in the parameters 118. After the value for the minimum voltage Va and/or the value of the maximum voltage Vb are changed, the voltage range 144 is updated and the voltage regulation device 110 performs a voltage operation when the voltage on the electrical power distribution network 105 is outside of the updated voltage range.

To continue to dynamically adjust the voltage bandwidth of the voltage regulation device 110, the process 300 returns to (310) and collects voltage samples for another instance of voltage data. Otherwise, the process 300 ends. For example, in some implementations, the operator is allowed to turn off the process 300 through the I/O interface 126. In these implementations, the voltage regulation device 110 continues to operate and uses the original voltage bandwidth 144 (or another constant, unchanging voltage bandwidth set by the operator).

As compared to a traditional process for controlling a voltage regulation device, the process 300 reduces the number of voltage regulation operations while still being able to maintain the voltage in the electrical power distribution network 105. This improves the lifetime of the voltage regulation device 110. Moreover, the process 300 does not rely on complex models or customized control tuning processes. Instead, the process 300 is based on collected data is able to react to changing conditions in real-time or near real time. The relative simplicity of the process 300 enables the process 300 to act quickly and thus improves the performance of the control system 120. Additionally, the process 300 does not include an adjustment of the delay time 145. Thus, the process 300 does not affect the coordination among more than one voltage regulation device 110.

FIGS. 4A and 4B show examples of distributions determined from simulated voltage data using a control system that implements the process 300. A distribution is a representation of the voltage data that indicates how many sample voltages are within each of a plurality of voltage ranges or voltage bins. FIG. 4A is a histogram 450A of example voltage data. FIG. 4B is a cumulative histogram 450B of the voltage data of FIG. 4A.

The voltage data used to make the distributions 450A and 450B was from a simulated power distribution network that was arranged as an IEEE 34-bus system that included a 700 kiloVolt (kV) photovoltaic DER as one of the power sources. The environmental conditions in the simulation were based on typical cloud cover and sunshine for a cloudy winter day in the western United States. The sample rate for obtaining voltage samples was 1 sample/second. The electronic storage 124 was able to hold up to 20,000 voltage samples. Each instance of voltage data included at least 1,000 voltage samples. Thus, FIGS. 4A and 4B are based on at least 1,000 consecutive voltage samples collected during a period of time. Although only one instance of voltage data is plotted in FIGS. 4A and 4B, the voltage bandwidth could be updated after 600 new samples were obtained.

FIG. 4A shows the percentage of voltage samples in each of a plurality of voltage bins. The voltage bins (in volts) are plotted along the x-axis, and the percentage of voltage samples are plotted along the y-axis. FIG. 4B is cumulative version of the data of FIG. 4A. FIG. 4B shows the percentage of occurrence as a function of measured voltage.

In the example of FIGS. 4A and 4B, an adjusted voltage bandwidth 452' is be determined from an initial voltage bandwidth 452. The initial voltage bandwidth 452 and the adjusted voltage bandwidth 452' are voltage ranges that are labeled on FIG. 4B. The initial voltage range 452 is a voltage range between the voltage corresponding to the minimum percentage or frequency of occurrence 453 and voltage corresponding to the maximum percentage or frequency of occurrence 454. In the example of FIG. 4B, the minimum percentage 453 was 16%, and the maximum percentage 454 was 84%. These values for the minimum percentage 453 and the maximum percentage 454 correspond to, respectively, the probability of a voltage sample falling one standard deviation below or above the average (or mean) sample value, assuming the distribution 450A is a normal distribution. These values for the minimum percentage 453 and the maximum percentage 454 may be used as approximations even if the distribution 450A is not a true normal distribution.

Other values may be used for the minimum percentage 453 and the maximum percentage 454. For example, the average and standard deviation of the voltage samples used to form the distribution 450A may be computed or estimated, and the minimum percentage 453 and the maximum percentage 454 may be set based on the measured voltages that are, respectively, one standard deviation below and above the mean. Moreover, the minimum percentage 453 and the maximum percentage 454 may be set by the operator in some implementations.

The initial voltage range 452 is further processed to determine the adjusted voltage bandwidth 452'. In this example, the adjusted voltage bandwidth 452' is a range of voltages defined by $(\mu-X\sigma)$ to $(\mu+X\sigma)$, where $\mu$ is the average (or mean) voltage in the voltage samples, $\sigma$ is the standard deviation of the voltages in the voltage samples, and X is a scaling factor. In the example of FIG. 4B, the scaling factor X was 3 such that the adjusted voltage bandwidth 452' are voltages between a voltage that is three standard deviations below the mean voltage and a voltage that is three standard deviations above the mean voltage. In the example of FIG. 4B, the minimum percentage 453' is 0.15%, and the maximum percentage 454' is 99.85%. Thus, in the example of FIG. 4B, the total probability of a voltage sample being outside of the adjusted voltage bandwidth 452' is 0.3%.

In other implementations, the scaling factor is applied to the computed or estimated standard deviation of the voltage samples, and the adjusted voltage bandwidth 452' are voltages that are in a range defined by $(\mu-X\sigma)$ to $(\mu+X\sigma)$, where $\mu$ is the computed or estimated average (or mean) voltage in the distribution, $\sigma$ is the computed or estimated standard deviation of the voltages in the distribution, and X is the scaling factor. The scaling factor X may be any numerical value. For implementations in which the scaling factor X is greater than 1, the adjusted voltage bandwidth 452' is wider (encompasses a larger range of voltages) than the initial voltage range 452. Moreover, the initial voltage bandwidth 452 and/or the adjusted voltage bandwidth 452' may be asymmetrical about the average voltage value.

FIGS. 5A-5F and FIGS. 6A-6F show example simulated results. The simulation had the same conditions as the simulation discussed above with respect FIGS. 4A and 4B. FIGS. 5A-5E show results from using a traditional control system that does not implement the process 300. FIG. 5C shows the voltage bandwidth as a function of time for the traditional control system. As shown, instead of the adaptable bandwidth implemented by the control system 120, the traditional control system uses a fixed and unchanging voltage bandwidth of 2V. FIGS. 6A-6E show example results from an implementation that includes the control system 120, which implements the process 300 and has a dynamic and adjustable voltage bandwidth. FIG. 6C shows the voltage bandwidth as a function of time for the implementation that uses the control system 120.

FIGS. 5A, 5B, 6A, and 6B are for a voltage regulation device VR1 that is relatively close to a substation. FIGS. 5D, 5E, 6D, and 6E are for a voltage regulation device VR2 that is further from the substation and more reliant on the PV DER. FIGS. 5F and 6F show the voltage variations seen by VR2 due to the presence of the DER. Thus, FIGS. 5A, 5B, 6A, and 6B are for a voltage regulation device that sees relatively less voltage variation than the voltage regulation device simulated to produce the results shown in FIGS. 5D, 5E, 6D, 6E.

However, in both instances, the simulated results achieved in the implementation that used the control system 120 are superior to those achieved with the traditional control system. For example, as shown in FIGS. 5A and 5B, with the traditional control system, the VR1 device performs ten tap operations (voltage regulation operations). As shown in FIGS. 5D and 5E, with the traditional control system, the VR2 device performs forty-two tap operations. As shown in FIGS. 6A and 6B, the VR1 device performs six tap operations with the control system 120, and, as shown in FIGS. 6D and 6E, the VR2 device performs sixteen tap operations with the control system 120. However, as is apparent from comparing FIG. 5A to FIG. 6A and FIG. 5D to FIG. 6D, the output voltage of the voltage regulation devices is relatively the same regardless of whether the traditional control system or the control system 120 is used. Thus, the control system 120 enables similar voltage control or regulation with fewer voltage regulation operations.

Other features are within the scope of the claims.

What is claimed is:

1. A voltage regulation system for an electrical power distribution network that receives electricity from one or more distributed energy resources, the voltage regulation system comprising:
   a voltage regulation device configured to maintain a voltage in the electrical power distribution network to within a voltage bandwidth, the voltage bandwidth comprising a range of voltages; and
   a control system coupled to the voltage regulation device and local to the voltage regulation device, the control system configured to:
     determine a distribution of occurrences based on voltage data from a local monitoring module, the distribution of occurrences comprising a count of occurrences of each of a plurality of voltage levels in the electrical power distribution network over a time period, the voltage data comprising a plurality of voltage samples, each of the voltage samples representing the voltage in the electrical power distribution network at a time within the time period;
     determine an adjusted voltage bandwidth for the voltage regulation device based on the distribution of occurrences; and
     change the voltage bandwidth of the voltage regulation device to the adjusted voltage bandwidth.

2. The voltage regulation system of claim 1, wherein
   the control system being configured to determine an adjusted voltage bandwidth comprises the control system being configured to determine a minimum voltage and a maximum voltage from the distribution of occurrences, and
   the control system being configured to change the voltage bandwidth of the voltage regulation device comprises the control system being configured to set the range of voltages to be between the determined minimum voltage and the determined maximum voltage.

3. The voltage regulation system of claim 2, wherein the distribution of occurrences comprises a cumulative distribution.

4. The voltage regulation system of claim 2, wherein the control system being configured to determine a minimum voltage comprises the control system being configured to determine a voltage exceeded by a first percentage of voltage samples, and the control system being configured to determine a maximum voltage comprises the control system being configured to determine a voltage exceeded by a second percentage of voltage samples.

5. The voltage regulation system of claim 1, wherein
   the control system being configured to determine the distribution of occurrences further comprises the control system being configured to estimate the standard deviation of the voltage in the electrical power distribution network over the time period,
   the control system being configured to determine an adjusted voltage bandwidth comprises the control system being configured to determine a minimum voltage and a maximum voltage based on the estimated standard deviation, and
   the control system being configured to change the voltage bandwidth of the voltage regulation device comprises the control system being configured to set the range of voltages to be between the determined minimum voltage and the determined maximum voltage.

6. The voltage regulation system of claim 1, wherein the voltage regulation device is configured to maintain the voltage in a particular portion of the electrical power distribution network, and the voltage regulation system further comprises: the local monitoring module, wherein the local monitoring module comprises a voltage sampling module configured to measure the voltage in the particular portion of the power distribution network at a particular time to generate one of the plurality of voltage samples.

7. The voltage regulation system of claim 1, wherein the control system is further configured to store the plurality of voltage samples.

8. A method of controlling a voltage regulation device that regulates a voltage in an electrical power distribution network, the method comprising:
   obtaining a plurality of voltage samples, each voltage sample being an indication of a voltage level in the electrical power distribution network at a time within a period of time;
   determining a count of occurrences of each of a plurality of voltage level ranges during the time period from the plurality of voltage samples;
   analyzing the determined count of occurrences to determine an adjusted voltage bandwidth for the voltage regulation device; and
   changing the voltage bandwidth of the voltage regulation device to the determined adjusted voltage bandwidth.

9. The method of claim 8, wherein changing the voltage bandwidth of the voltage regulation device comprises replacing a previous voltage bandwidth of the voltage regulation device with the determined adjusted voltage bandwidth such that the voltage regulation device performs a voltage regulation operation when the voltage level in the electrical power distribution network is outside of the determined adjusted voltage bandwidth.

10. The method of claim 8, wherein the period of time is a first period of time, and the determined adjusted voltage bandwidth is a first determined adjusted bandwidth, and the method further comprises:
   obtaining a second plurality of voltage samples, at least one of the voltage samples in the second plurality of voltage samples being an indication of a voltage level in the electrical power distribution network at a time during a second time period, the second time period comprising at least one time that is not within the first period of time;

analyzing the second plurality of voltage samples to determine a second adjusted voltage bandwidth for the voltage regulation device; and changing the voltage bandwidth of the voltage regulation device from the first determined adjusted voltage bandwidth to the second adjusted voltage bandwidth.

11. The method of claim 8, wherein the count of occurrences comprises a cumulative distribution.

12. The method of claim 8, further comprising analyzing the count of occurrences to determine a standard deviation of the voltage levels in the electrical power distribution network.

13. The method of claim 12, wherein analyzing the determined count of occurrences to determine an adjusted voltage bandwidth comprises adjusting the voltage bandwidth based on the standard deviation.

14. The method of claim 8, wherein the count of occurrences is determined only after obtaining a threshold number of voltage samples.

15. The method of claim 8, wherein obtaining the plurality of voltage samples comprises obtaining the plurality of voltage samples from a local monitoring module; and the count of occurrences is determined at an electronic processing module of a control system that is local to the voltage regulation device;

the determined count of occurrences is analyzed at the control system that is local to the voltage regulation device; and changing the voltage bandwidth of the voltage regulation device comprises causing the controller to generate a command signal and to provide the command signal to the voltage regulation device via a control cable.

16. The voltage regulation system of claim 1, wherein the control system and the voltage regulation device are housed together in a single unit.

17. An integrated voltage regulation system comprising:

a voltage regulation device comprising a local monitoring module, wherein the voltage regulation device is configured to maintain a voltage in a particular portion of an electrical power distribution network to within a voltage bandwidth;

a control cable; and a local control system coupled to the voltage regulation device via the control cable, the local control system configured to:

obtain voltage data from the local monitoring module, the voltage data comprising a plurality of voltage samples, each of the voltage samples representing the voltage measured by the local monitoring module at a time within a time period;

determine a count of occurrences of each of a plurality of voltage level ranges during the time period from the plurality of voltage samples;

determine an adapted voltage bandwidth for the voltage regulation device based on the count of occurrences;

generate a command based on the adjusted voltage bandwidth;

provide the command to the voltage regulation device to change the voltage bandwidth of the voltage regulation device to the adapted voltage bandwidth.

18. The integrated voltage regulation system of claim 17, wherein the control system is configured to determine a cumulative distribution based on the count of occurrences and/or a standard deviation of the voltage in the particular portion of the electrical power distribution network based on the count of occurrences.

19. The integrated voltage regulation system of claim 17, wherein the voltage regulation device and the local control system are enclosed in a single housing.

20. The integrated voltage regulation system of claim 17, wherein the local control system further comprises a communications interface configured to allow communication between the local control system and a separate and distinct device that is remote from the integrated voltage regulation system.

21. The integrated voltage regulation system of claim 20, wherein the separate and distinct device comprises a remote station or another integrated voltage regulation system.

22. The integrated voltage regulation of claim 17, wherein the integrated voltage regulation system comprises a load-tap changer.

23. The voltage regulation system of claim 1, wherein the count of occurrences for each of the plurality of voltage levels is expressed as a portion or percentage of total occurrences for all voltage levels.

* * * * *